United States Patent [19]

Rosenzweig

[11] Patent Number: 5,351,791
[45] Date of Patent: Oct. 4, 1994

[54] DEVICE AND METHOD FOR ABSORBING IMPACT ENERGY

[76] Inventor: Nachum Rosenzweig, 3440 Bryant St., Palo Alto, Calif. 94306

[21] Appl. No.: 171,340

[22] Filed: Dec. 20, 1993

Related U.S. Application Data

[63] Continuation of Ser. No. 855,045, Jul. 1, 1992, abandoned.

[30] Foreign Application Priority Data

May 18, 1990 [IL] Israel .......................................... 94442

[51] Int. Cl.$^5$ .............................................. F16F 7/12
[52] U.S. Cl. ....................................... 188/372; 188/374
[58] Field of Search .................................. 188/371–377

[56] References Cited

U.S. PATENT DOCUMENTS

| | | | |
|---|---|---|---|
| 2,997,325 | 8/1961 | Peterson | 293/1 |
| 3,236,333 | 2/1966 | Mitchell | 188/374 |
| 3,331,460 | 7/1967 | Bacon | 180/1 |
| 3,380,557 | 4/1968 | Peterson | 188/374 |
| 3,381,778 | 5/1968 | Tiesenhausen | 188/375 |
| 3,428,150 | 2/1969 | Muspratt | 188/375 |
| 3,532,380 | 10/1970 | Studer et al. | 297/386 |
| 3,656,792 | 4/1972 | Tavano, Sr. | 293/85 |
| 3,841,678 | 10/1974 | Clemens | 188/372 X |
| 3,865,418 | 2/1975 | Saxl | 293/89 |
| 4,031,978 | 6/1977 | Taylor | 180/91 |
| 4,182,529 | 1/1980 | Taylor | 293/132 |
| 4,349,167 | 9/1982 | Reilly | 188/372 X |
| 4,523,730 | 6/1985 | Martin | 244/122 R |
| 5,074,391 | 12/1991 | Rosenzweig | 188/374 |
| 5,074,392 | 12/1991 | Hasegawa et al. | 192/52 |

FOREIGN PATENT DOCUMENTS

| | | | |
|---|---|---|---|
| 0246545 | 11/1987 | European Pat. Off. | |
| 2839718 | 3/1980 | Fed. Rep. of Germany. | |
| 1097699 | 1/1968 | United Kingdom | 188/372 |
| 1506157 | 4/1978 | United Kingdom | 188/374 |
| 2048430 | 12/1980 | United Kingdom | 188/374 |

OTHER PUBLICATIONS

Wells, J. K., (1985) "Development and Application of Energy . . ." 40th Annual Conf., Reinforced Plastics Composites Institute . . .

*Primary Examiner*—Robert J. Oberleitner
*Assistant Examiner*—Alfred Muratori
*Attorney, Agent, or Firm*—Ladas & Parry

[57] ABSTRACT

An energy absorbing device comprising: an elongate body arranged along a longitudinal axis to receive an axial impact force at a first end thereof; apparatus arranged adjacent a second end of the body for deformation thereof; die apparatus for producing deformation of the body and a ring fixed to the die apparatus and surrounding the body. Also disclosed is a repeatable energy absorption device including crushing apparatus having threaded apparatus on its outside surface. Upon receipt of the axial impact, the first end of the body moves from a first position away from the crushing apparatus to a second position closer to the crushing apparatus. The device additionally includes threaded sleeve apparatus having a first end for supporting the crushing apparatus and for moving the crushing apparatus toward the first end after the axial impact, to return the first end of the body to the first position.

15 Claims, 12 Drawing Sheets

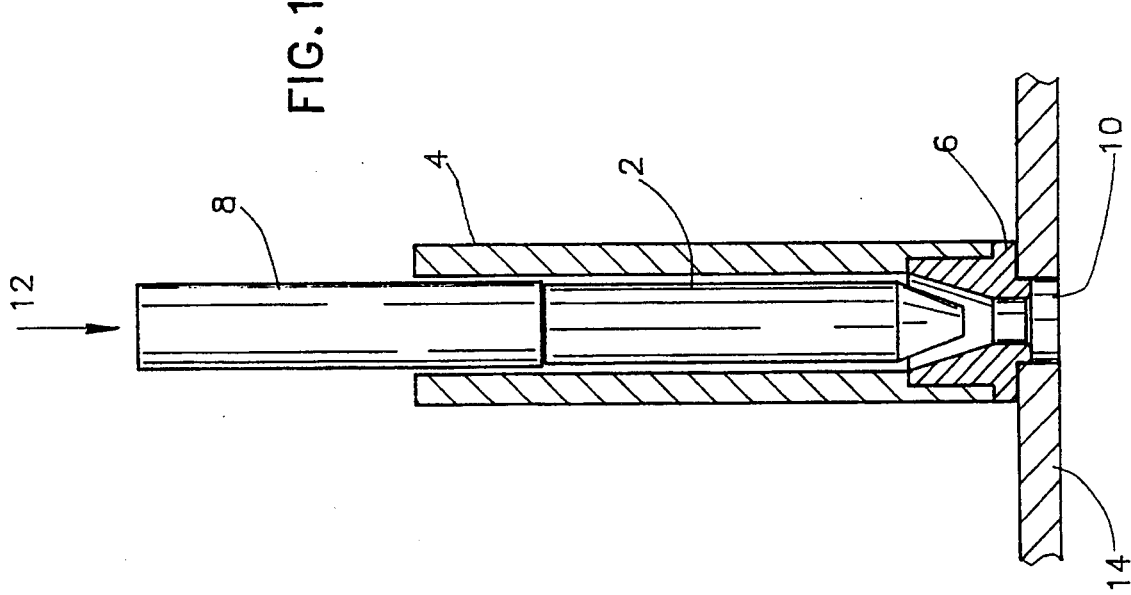
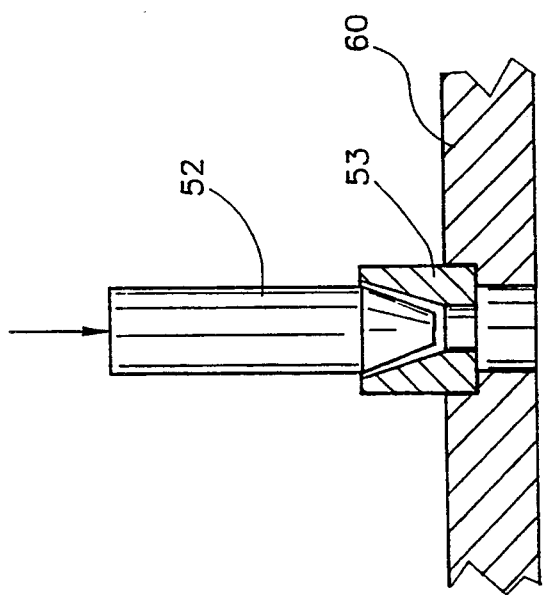

DEVICE AND METHOD FOR ABSORBING IMPACT ENERGY

This is a continuation of copending application(s) Ser. No. 07/855,045 filed on Jul. 1, 1992 now abandoned and International Application PCT/US90/06421 filed on Nov. 6, 1990 and which designated the U.S.

The present invention relates to a device for absorbing impact energy.

In many dynamic systems, there is sometimes created a destructive deceleration which develops within a relatively short distance. While in certain circumstances, a compartment subject to distortion may provide an adequate survival space, nevertheless, the human body cannot withstand deceleration forces, above a certain limit.

The efficiency of an energy absorbing device is given by the ratio: SEA (specific energy absorbed) = energy absorbed/device weight.

A common unit of specific energy is J/g. (Joules/gram). The desirable features of an energy absorbing device are as follow:

it should provide a predictable FORCE vs. DEFORMATION trace;

the rapid loading rate expected in crashes should not change the FORCE vs. DEFORMATION behaviour;

it should operate under both tension and compression;

the device should be as light and as small as possible;

the specific energy absorption (SEA) should be high;

it should be economical to manufacture;

it should be reliable and maintenance-free for a long period of time;

it should not be adversely affected by dirt, corrosion or other environmental factors;

the person involved should be decelerated in the most efficient manner possible, while maintaining the loading environment within the limits of human and/or payload tolerance;

its stroke should be relatively long as compared to its total length (i.e. a high stroke efficiency).

There are many EA devices for impact applications, the most common ones utilize deformation of metals and friction to dissipate energy. Some examples are as follows:

| Device | SEA(J/g.) |
| --- | --- |
| axial compression of a steel tube | 25 |
| axial compression of an Al tube | 16 |
| steel strap/wire over die or roller | 4 |
| steel inversion tube | 4 |
| basic elongation of steel | 14 |
| crushing a rigid foam | 20 |
| steel rod pulled through a tube | 2 |
| tube flaring | 3 |
| controlled crushing of a metal tube | 45 |
| controlled crushing of structural honeycomb | 40 |
| controlled axial crushing of a composite tube | |
| with Kevlar ® reinforcing fiber | 20 |
| with glass reinforcing fiber | 60 |
| with carbon reinforcing fiber | ≦100 |

It should be noted that in the last three cases (controlled axial crushing of a composite tube) the reported SEA values refer to the absorbing material and not to the entire device. Moreover, carbon fibers are relatively expensive. In addition to the above examples, there exist SEA devices based on an elastic element such as springs, compressed gas and fluids. However, their stroke is short, the force increases and they become almost rigid. Their strong recovery and bounce back are undesirable. In some cases (pneumatic/hydraulic shock absorbers) a valve forces fluid out at a predesigned pressure; such devices have SEA in the range 5 to 25 J/g.

In U.S. Pat. No. 4,523,730 (Martin), there is disclosed an energy absorbing seat arrangement, particularly for a helicopter, in which a seat pan is carried by a frame slidably mounted on parallel upwardly extending pillars secured to the helicopter. Normally, downward sliding of the frame on the pillars is prevented either by metal rods extending through drawing dies, or by a deformable metal tube and a mandrel extending through the tube. In the event of a crash, the rods are drawn through the dies or the mandrel through the deformable tube. However, this metal/metal arrangement, like other similar arrangements, suffers from a relatively low SEA, the fact that it is very restricted as to its potential for cross-sectional area reduction (maximum elongation of a ductile stainless steel is only 45–50%), dependence on metal/metal friction to maintain a uniform load is unpredictable, while oxidation may alter the properties of the metal/metal interface. As will be seen, the present invention does not utilize a metal/metal arrangement and thus avoids such problems.

U.S. Pat. No. 3,865,418 describes an energy absorbing device for a vehicle including a cylinder having a stepped inner diameter and in which an annular plastic slug is extruded between the cylinder and a stepped ram. The stroke efficiency is less than one half of the length of the device.

U.S. Pat. No. 2,997,325 to Peterson described a kinetic energy absorber in which a piston forces an extrudable body through a nozzle. U.S. Pat. No. 3,380,557 describes a variable kinetic energy absorber in which a piston serially forces a plurality of extrudable bodies, each having an increased resistance to extrusion, through a nozzle. Both of these patents employ a cylinder formed of heavy metal in order to withstand the high pressure produced during extrusion. The proposed structure is relatively heavy and therefore the absorber has a reactively low SEA. The piston stroke is limited to the length of the cylinder and thus the stroke efficiency of the absorber is limited to less than one half of the overall absorber length. Furthermore, during stroking, the friction force between the extrudable plastic material and the cylinder wall decreases producing a consequent reduction in the stopping force of the absorber, as the stroke progresses.

U.S. Pat. No. 3,532,380 describes an energy absorbing device for a restraint belt. GB Patent Application 1,506,157 describes an energy absorbing device employing a piston and extrudable material which is similar to that described in U.S. Pat. No. 3,865,418 but employs a smooth cylinder. U.K. Published Patent Application 2,048,430 describes a device absorbing energy by extrusion.

It is an object of the present invention to provide an energy absorption device having the desirable properties listed above. Another object of the present invention is to provide such a device having specific energy absorption generally higher than the SEA's of prior art EA devices.

The present invention employs the realization that a solid body of ductile material is capable of transmitting axial forces therethrough, generally without dissipation of the force in non-axial directions.

Further objects of the invention will be apparent from the description which follows.

The present invention accordingly provides an energy absorption device which comprises an elongate body of a ductile material arranged along a longitudinal axis arranged to receive an axial impact force at a first end thereof along the longitudinal axis, apparatus adjacent a second end of the body of ductile material for extrusion thereof, the body of ductile material being operative to transmit the axial impact force axially therethrough from the first end to the second end.

In accordance with the present invention the pistons and cooperating cylinders required by the prior art, which add significant weight and greatly limit the stroke efficiency may be eliminated. A high SEA is provided.

In accordance with one preferred embodiment of the invention a relatively thin walled sleeve may be provided to prevent buckling of the elongate body. Preferably, the sleeve is frangible during extrusion at the second end, so as to enable the available stroke length to be nearly equal to the overall length of the energy absorbing device.

Preferably, the body of ductile material comprises at least one discrete ductile solid element which undergoes reduction of its cross-sectional area and in particular undergoes combined deformation of shear compression and elongation. The solid element is preferably formed of a polymer, such as Nylon-6, Nylon 6-6, Nylon 6,12, Polypropylene, Polycarbonate, Polysulfone, Polyetheretherketone, or Stilan, manufactured by Raychem Corporation of California, of USA. The work of deformation, plus friction between the ductile solid and the solid surface of whatever is used to effect reduction of the cross-sectional area, absorb the kinetic energy of a decelerating object. In accordance with the invention, the cross-sectional area as aforesaid is reduced by at least 25%, preferably at least 40% and most preferably at least 50%.

In a particular embodiment, the invention provides a device for absorbing impact energy, which comprises in operative combination: at least one discrete ductile elongate solid body which receives an impact force and retains its coherence when undergoing reduction of its cross-sectional area by not less than 25%; a rigid element defining a restricted space having a smaller cross-sectional area than the at least one discrete ductile solid shape, whereby when the shape is subjected to a force which induces it to pass through the restricted space, the smaller cross-sectional area is such that the shape by passage through the restricted space experiences a reduction in cross-sectional area of not less than 25%; and a transmission, which may include a piston, for transmitting impact energy incident on the device to the at least one discrete ductile solid shape, whereby the latter is subjected to a force which induces it to at least in part pass through the restricted space.

In another embodiment, the invention provides a method for absorbing impact energy, which comprises the step of applying an impact force along a longitudinal axis to a first end of an elongate body of a ductile material arranged along the longitudinal axis, thereby causing it to be extruded by apparatus arranged adjacent a second end of the body of ductile material, wherein the elongate body of ductile material is operating to transmit the axial impact force axially therethrough from the first end to the second end.

In accordance with a preferred embodiment of the invention, the body of ductile material is subjected to a force, transmitting at least part of the impact energy to at least one discrete ductile solid shape, whereby the latter is subjected to a force, which may include e.g. compressive and/or tensional forces, which reduces its cross-sectional area by not less than 25%, while the ductile solid maintains its coherence. The force is preferably one which induces the discrete ductile solid shape to at least in part pass through a restricted space, and the latter may be defined by a rigid part and would have a smaller cross-sectional area than the discrete ductile solid shape, whereby when the shape is subjected to a force which induces it to pass at least in part through the restricted space, the smaller cross-sectional area is such that the shape by passage through the restricted space experiences a reduction in cross-sectional area of not less than 25%.

In accordance with an alternative embodiment of the present invention, there is provided a device for absorbing energy during an axial initial impact and during an elastic rebound in a direction opposite that of the axial initial impact, comprising an elongate body arranged along a longitudinal axis which comprises elongate fibers along its axis and which is operative to receive the axial initial impact force at a first end thereof along the longitudinal axis. The device also comprises apparatus arranged adjacent a second end of the body for deformation thereof. The apparatus includes die apparatus for producing deformation of the body and ringed apparatus fixed to the die apparatus and spaced therefrom for surrounding the body adjacent the die apparatus and for breaking the elongate fibers into elongate stringlike elements which maintain high tensile strength during the elastic rebound.

There is further provided, in accordance with the present invention, a repeatable energy absorption device comprising, a deformable and crushable body arranged along a longitudinal axis operative to receive an axial impact force at a first end thereof along the longitudinal axis, deforming and crushing apparatus arranged adjacent a second end of the body for deformation thereof and for crushing of the crushable sleeve wherein the deforming and crushing apparatus include threaded apparatus on an outside surface thereof and wherein upon receipt of the axial impact, the first end of the body moves from a first position away from the deforming and crushing apparatus to a second position closer to the deforming and crushing apparatus and threaded sleeve apparatus having a first end for supporting the deforming and crushing apparatus and for moving the deforming and crushing apparatus toward the first end after the axial impact thereby to return the first end of the body to the first position.

Additionally, there is provided, a vehicle with an energy absorption device comprising a chassis, a bumper for receiving axial impact forces and an energy absorption device disposed between the chassis and the bumper for absorbing impact energy comprising a deformable and crushable body arranged along a longitudinal axis operative to receive the axial impact forces at a first end thereof along the longitudinal axis, deforming and crushing apparatus arranged adjacent a second end of the body for deformation and crushing thereof, the body being operative to transmit the axial impact force axially therethrough from the first end to the second end and to move from a first position to a second position in consequence of the axial impact force and restoring apparatus for restoring the energy absorption device from the second position to the first position.

There is provided, in accordance with an embodiment of the present invention, an energy absorption device for absorbing impact energy comprising a deformable and crushable body arranged along a longitudinal axis operative to receive the axial impact forces at a first end thereof along the longitudinal axis, deforming and crushing apparatus arranged adjacent a second end of the body for deformation and crushing thereof, the body being operative to transmit the axial impact force axially therethrough from the first end to the second end and to move from a first position to a second position in consequence of the axial impact force and restoring apparatus for restoring the energy absorption device from the second position to the first position.

There is further provided, in accordance with the present invention, an energy absorption device including a crushable sleeve operative to receive said axial impact force at a first end thereof, crushing apparatus arranged adjacent a second end of said body for crushing of the crushable sleeve, said crushing apparatus including a die having an outer conical surface and a cage apparatus for enclosing the die and for producing crushing of the crushable sleeve, wherein the cage apparatus have a plurality of slots and an inner surface and wherein the crushing occurs between the conical surface and the inner surface in the area of each of the plurality of slots.

Finally, in accordance with the present invention, the energy absorption device also includes apparatus for adjusting the location of the die with respect to the cage apparatus thereby to control the amount of energy absorbed.

FIG. 1 illustrates in section an embodiment of the present invention;

FIG. 3 illustrates in section a further embodiment of the present invention;

Figure 5A:
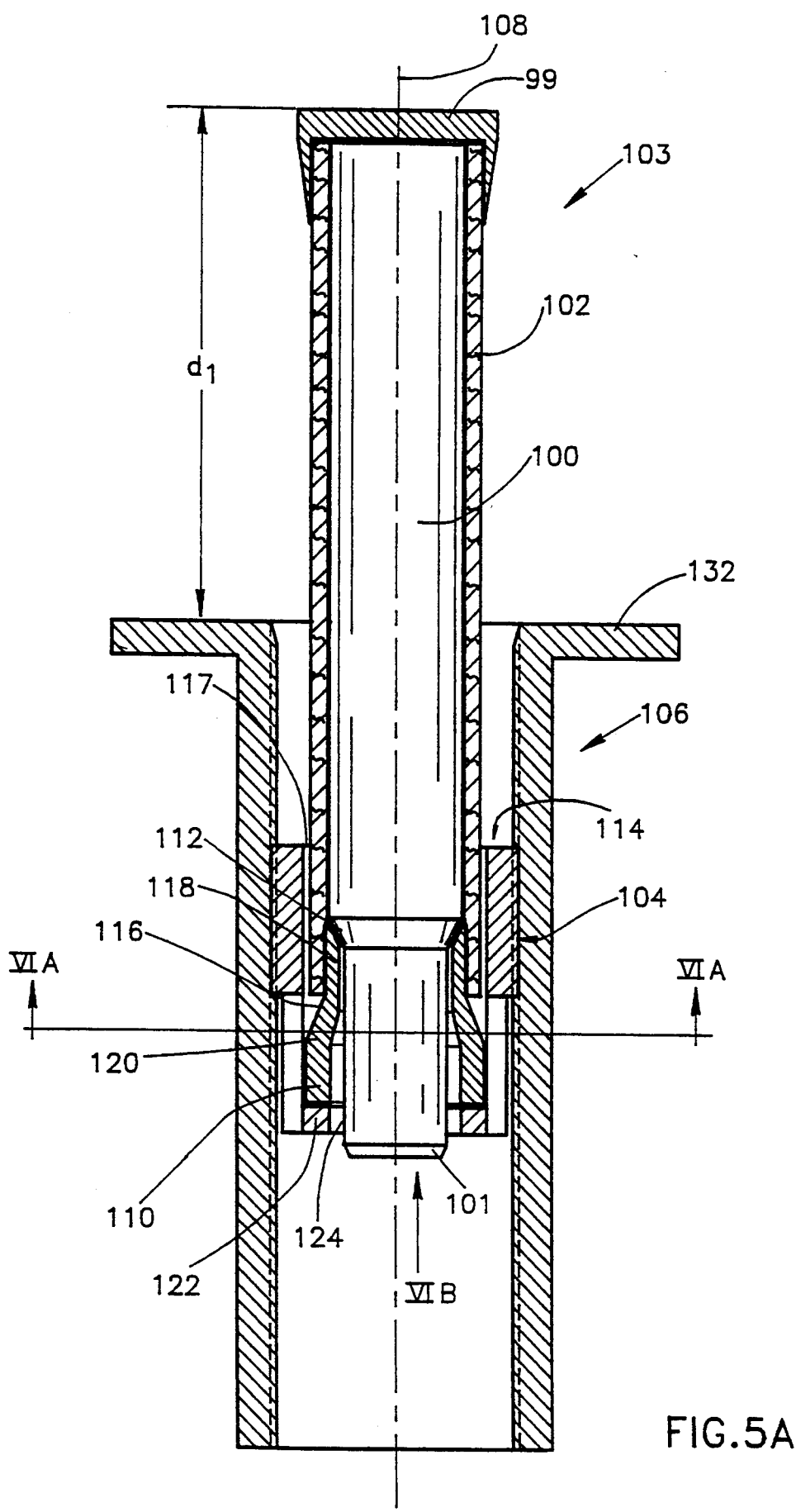
Figure 6A:
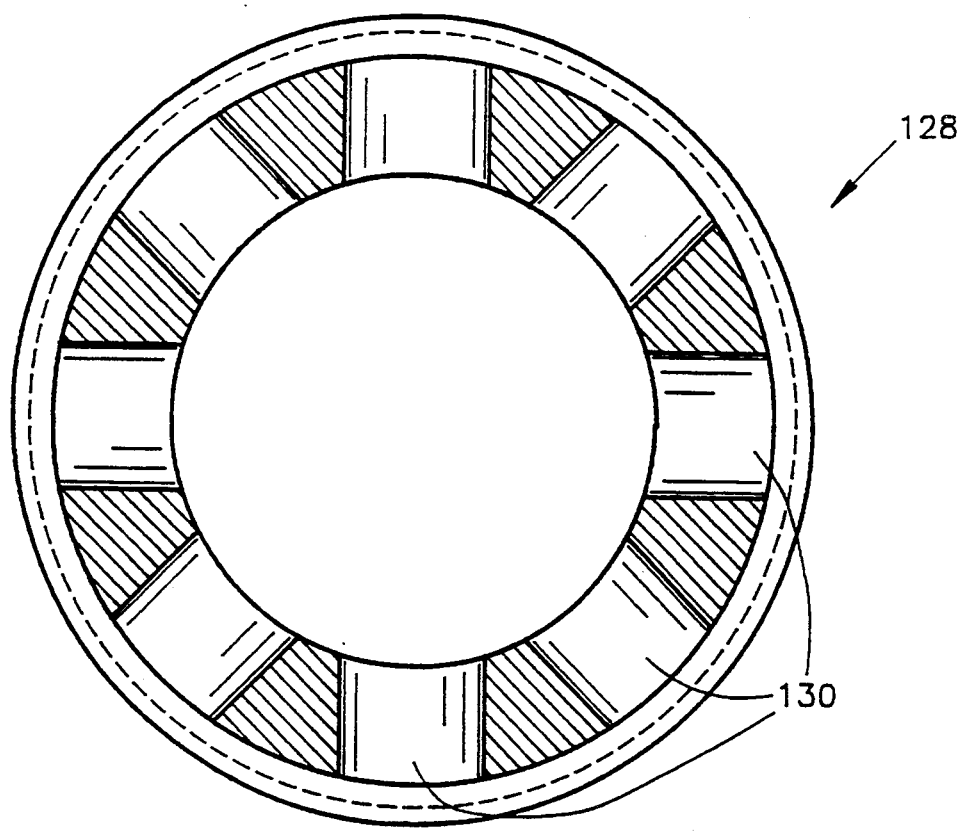
Figure 6B:
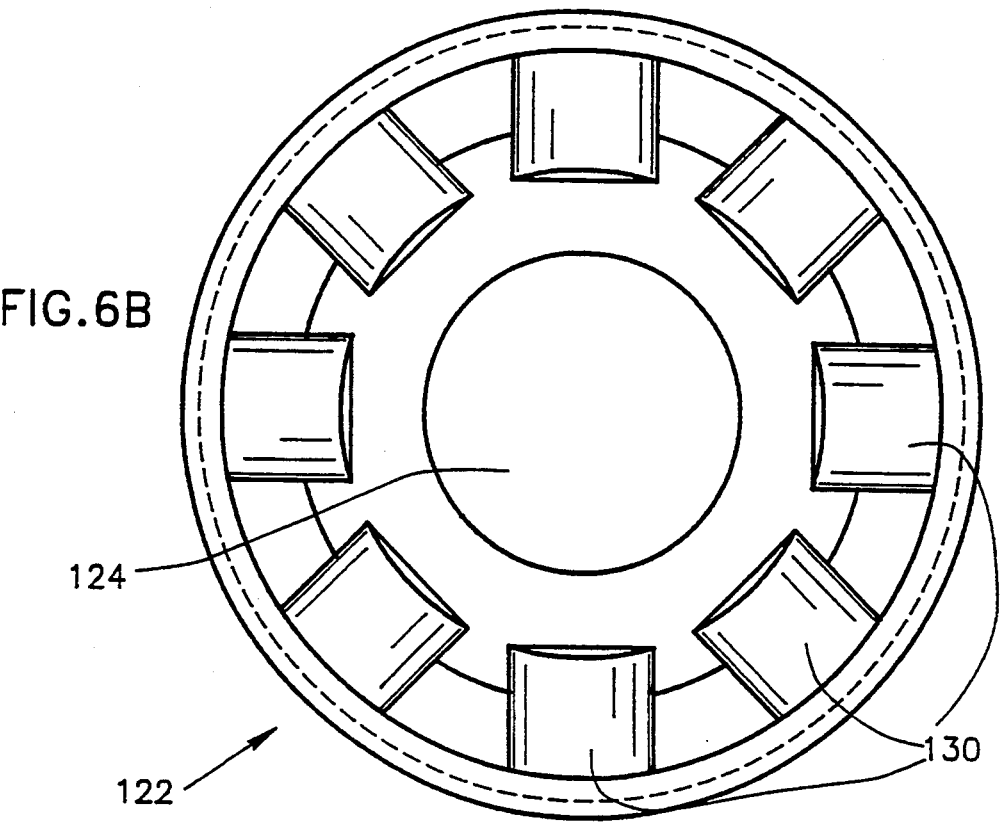
Figure 7A:
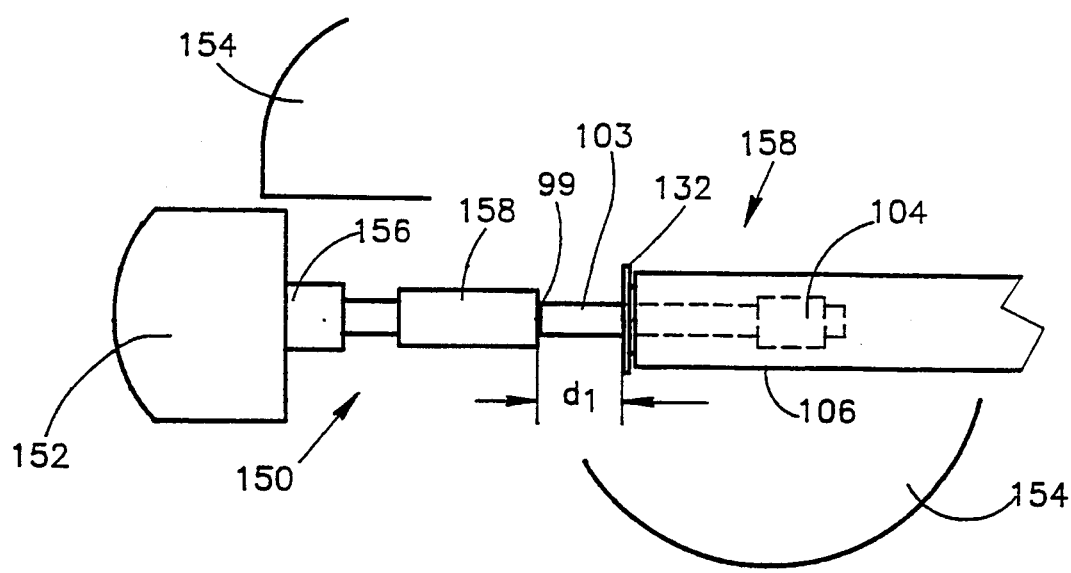
Figure 7B:
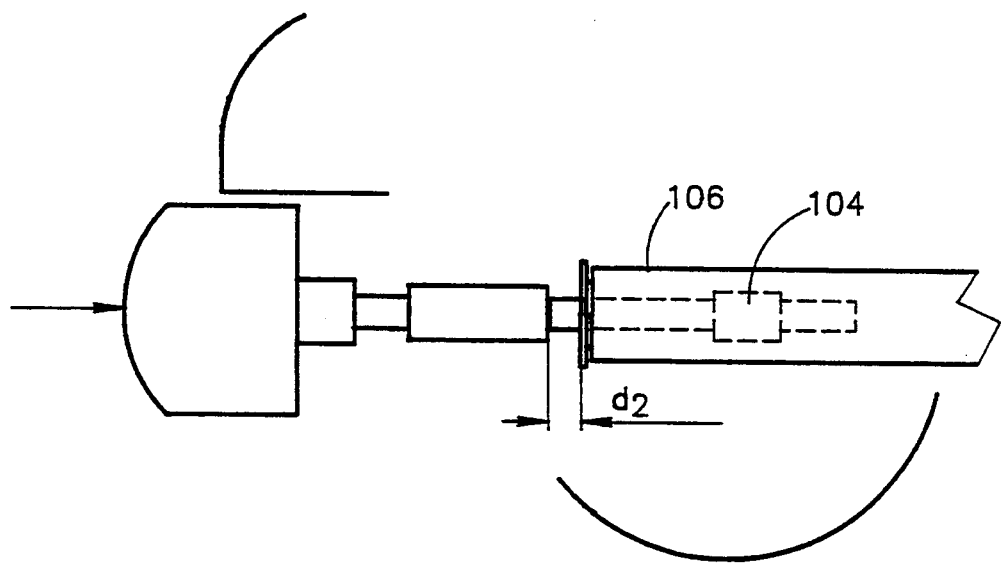
Figure 7C:
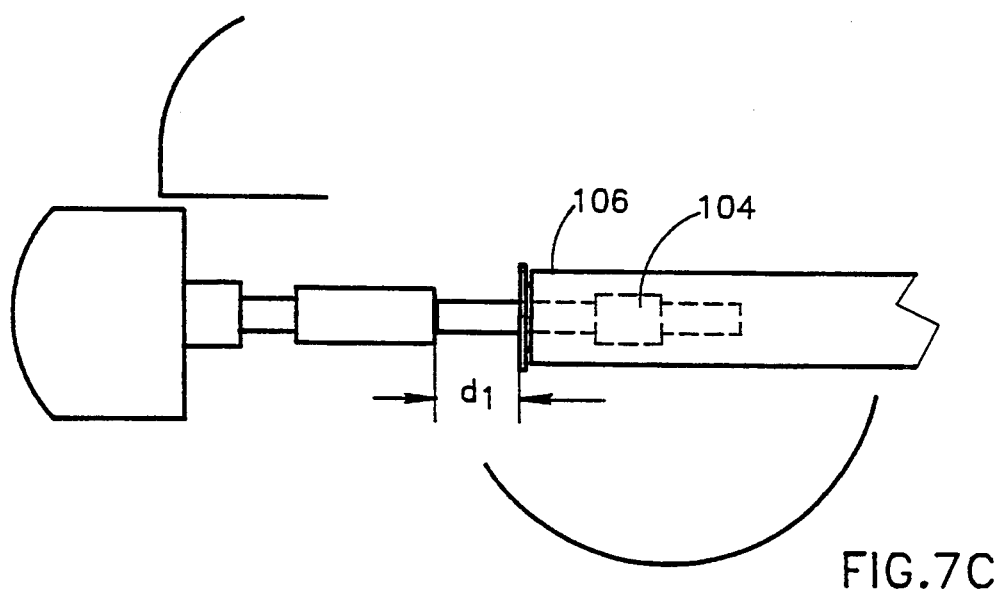
Figure 8A:
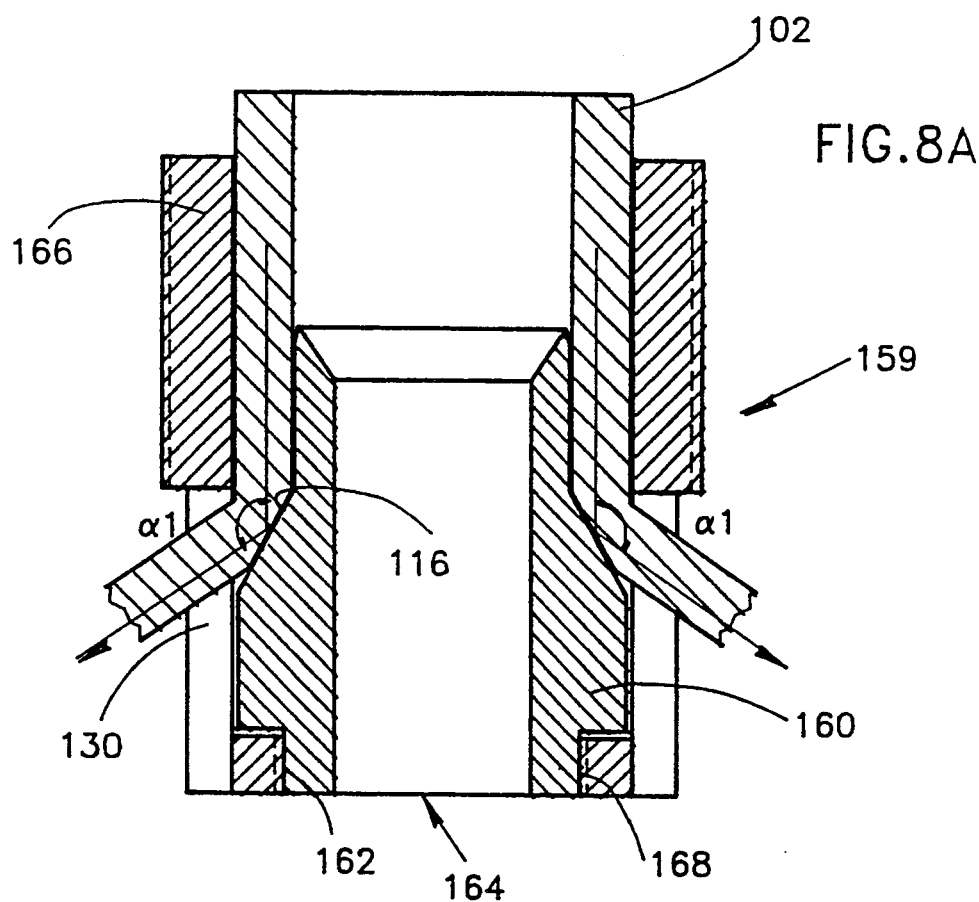
Figure 8B:
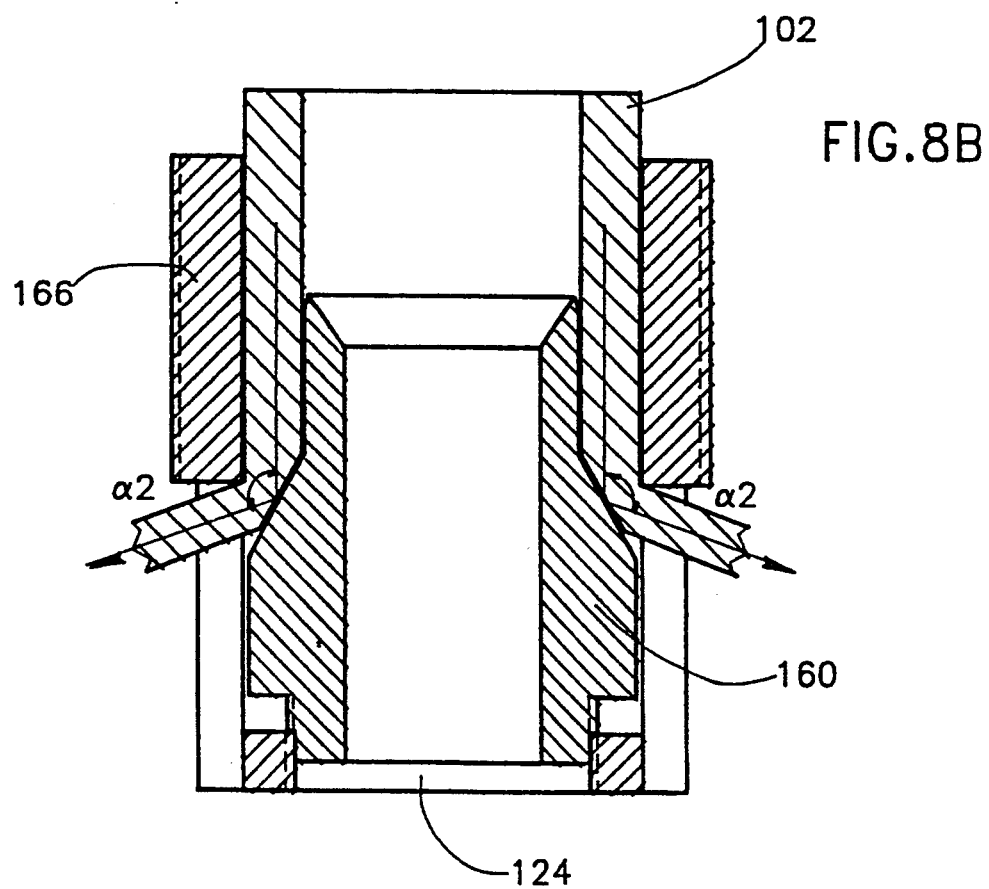
Figure 9:
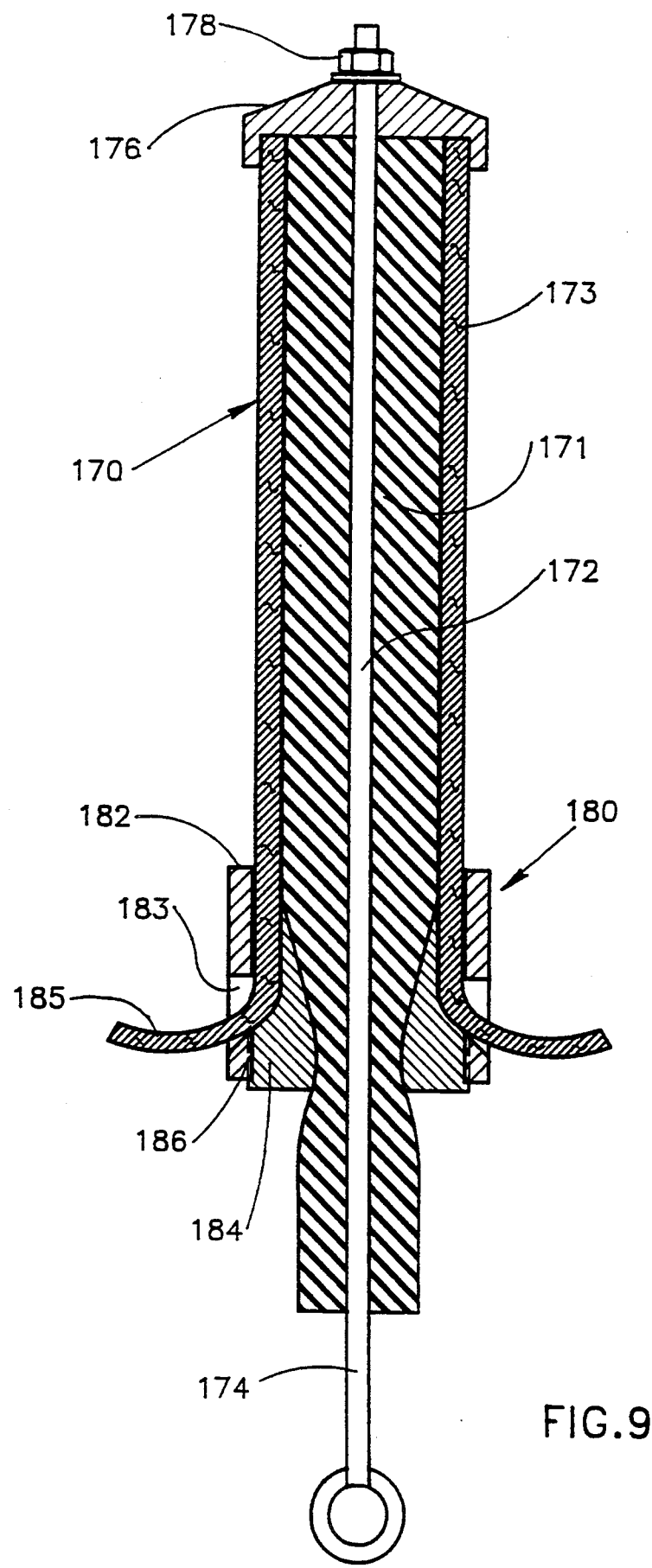
Figure 10:
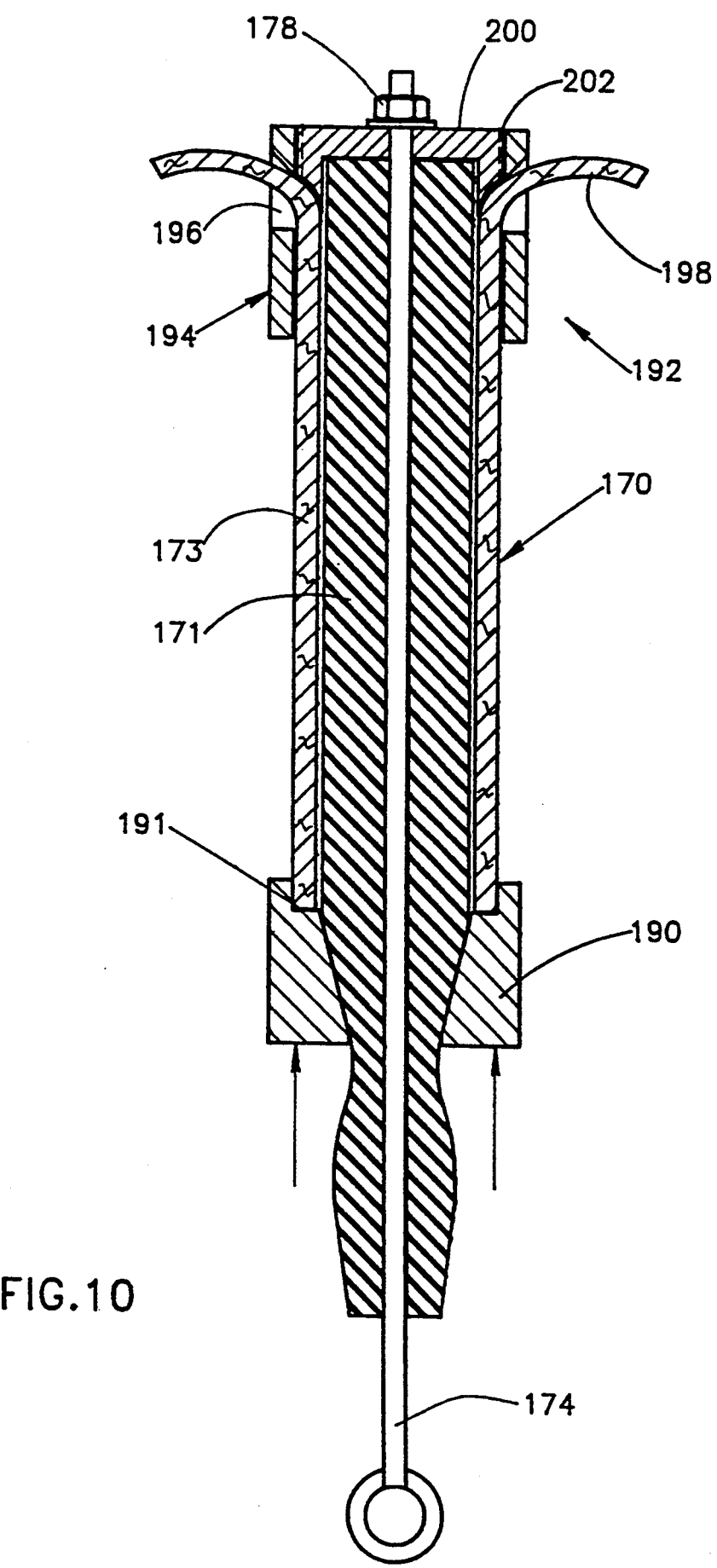

FIGS. 5A-%C illustrate in section a second preferred embodiment of the present invention useful for absorbing high impact energy;

FIGS. 6A and 6B illustrate in section elements of the embodiment of FIG. 5A;

FIGS. 7A-7C illustrate a car bumper system utilizing the embodiment of FIG. 5A;

FIGS. 8A and 8B illustrate an alternative embodiment of elements of the embodiment of FIG. 5A;

FIGS. 9 and 10 illustrate further embodiments of the present invention; and

Figure 11:
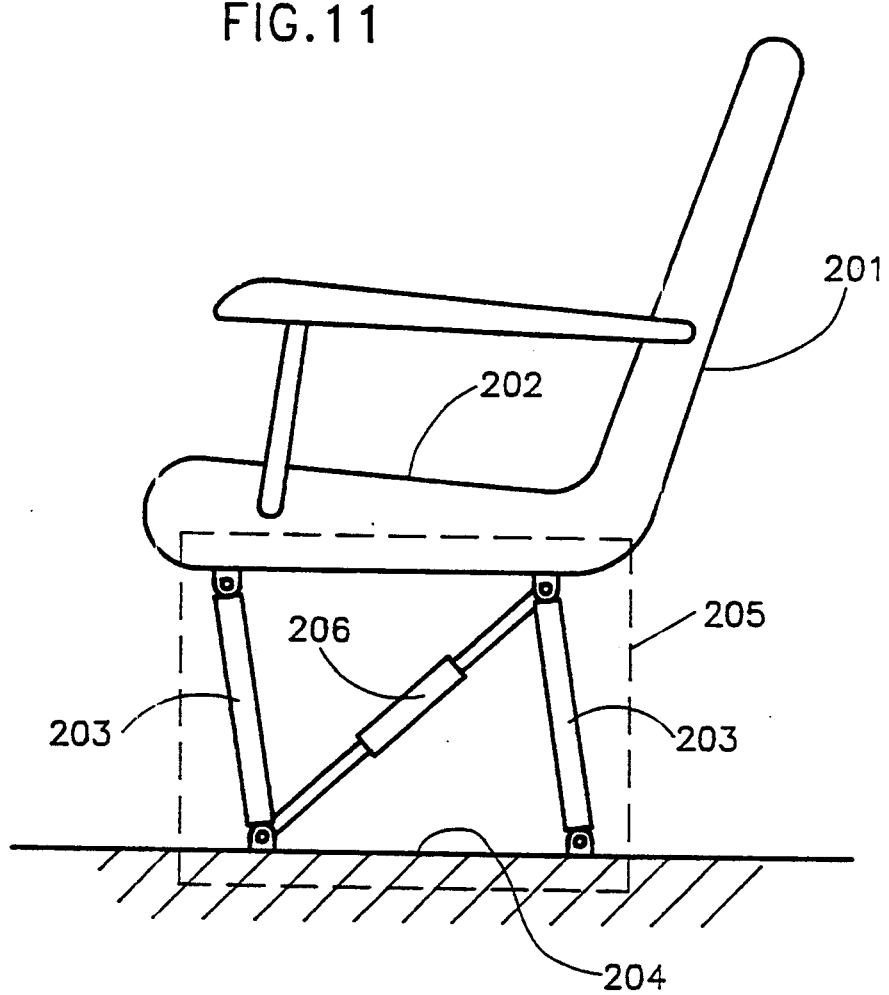

FIG. 11 illustrates an embodiment of the present invention incorporated into a collapsible seat.

According to a particular embodiment of the invention, the discrete ductile solid shape is in the form of a billet which has a conically shaped head, the axis of symmetry of this head being directed towards the hole of a die, so that when impact occurs, the billet begins to be extruded therethrough. The SEA of the shape is preferably at least 40, more preferably at least 50, yet more preferably at least 70 and most preferably at least 80 J/g. While for purposes of illustration reference will be made herein to billets, it will be appreciated by persons skilled in the art that other suitable shapes may be made to undergo the required reduction in cross-sectional area, normal to the stroke direction.

It has been found in accordance with the invention, that the higher the cross-sectional ratio between the die's inlet and its outlet (i.e. the draw ratio=DR), that a material can tolerate without breaking, the higher is the pressure required to pass it through the die, and the higher is the work done on the extruded material. Each material has a different maximum useful DR (although in general this will usually be less than 9), and the pressure required to force it through a die may also vary. However, the material of the billet should not break in the die, it should maintain its continuity until emerging therefrom. Otherwise, rupture of the material in the die may cause sharp changes in the magnitude and direction of the force and the deceleration, and the energy absorbing process is destabilised. Materials which may not be used for the device of the invention may be illustrated by two extremes, namely, low viscosity fluids in which the pressure required to pass them through a given die and the work done are low, and materials which are so hard that it is practically impossible to pass them through a die.

The work done is the sum of two components: the friction between the billet and the die, and the work required to reshape the billet. The friction component should be limited in magnitude, in those cases where it is difficult to control the normal force causing the friction and/or in those cases where heat evolved at the die-billet interface cannot be dissipated efficiently. The work done to reshape the billet is desirable, since it is three-dimensional work, the heat generated being absorbed throughout the billet's volume.

The SEA of the billet is directly proportional to the extrusion pressure and inversely proportional to the billet's density, as may be seen from the equation:

$$SEA = 0.0981 \, p/d \tag{1}$$

where d is the density of the billet material expressed in g./cm$^3$ units and p is the extrusion pressure expressed in kg./cm$^2$ units.

It was surprisingly discovered in accordance with the present invention that if the billet is made of a polymeric material, then its SEA is usually higher, compared with other materials such as mechanically stronger metals. Moreover, polymeric materials can usually be extruded through a conventional die, without external heating, and they generally develop considerable stress without breaking in the die, at high stroke speeds, with high cross-sectional reductions rates. In fact, their generally lower density compared with metals magnified their SEA advantage. Particularly useful in accordance with the invention are billets made from ductile polyamides and polyolefins. Exemplary polyolefins are polyethylene and polypropylene, preferably of high molecular weight; among polyethylenes, most preferred is that of ultra high molecular weight. In general for a given DR, the higher the molecular weight of the polyethylene, the higher the SEA. Presently preferred is polyethylene having a molecular weight of about $3.3 \times 10^6$. However, it was surprising to find that above this molecular weight, the SEA fell, at least for DR's above 4, at testing velocities of 0.025 meters/sec. and above, due to either extrudate cracking, or breakage in the die.

In connection with the present invention, it has been observed that on room temperature extrusion of some polymers through a die, even at a high feed rate (such as e.g. 11 meters/sec.), the extrudate elongation exceeded the reported values of the ultimate elongation at room temperature of a slow speed tensile test. Examples are given in the following Table:

| Polymer | Reported Elongation | Elongation Found |
|---|---|---|
| Nylon 6 and 6/6 | 300% | 400% |
| Polyacetal | 100% | 400% |
| Polycarbonate | 110% | 186% |
| Rigid PVC | 80% | 186% |

These observations are surprising, since polymers are rate sensitive and would be expected to fail due to brittleness at a higher rate tensile test. Since the energy absorbed by a material is a product of deformation force and strain displacement, this demonstrated extra ductility is very useful in providing an increased amount of energy that a polymer can absorb and thus the foregoing polymeric materials may be advantageously employed in accordance with the present invention.

The SEA values that were calculated from experimental data, for some polymeric systems, were found to be exceptionally high, when compared with values know in the art, as have been set out above Examples are given in the following Table. It will be appreciated that the higher the DR that a material can be extruded through without breaking, the higher is its SEA.

| Polymer | DR | SEA(J/g.) |
|---|---|---|
| Polyethylene* | 6.1 | 244 |
| Polypropylene | 6.1 | 352 |
| Nylon 6 | 6.1 | 367 |
| Nylon 6/6 | 5 | 346 |
| Nylon 6/6 | 6.1 | 440 |

The overall SEA of an energy absorbing device is equal to or lower than that of the material per se. Thus, the upper limit on the efficiency of an EA device is determined by the intrinsic energy absorption capability of the particular material. The concept of the present invention enables the design and construction of efficient and lightweight energy absorption devices.

It has also been discovered in accordance with the present invention that an additive such as carbon black, when incorporated into the polymeric material increases its SEA. However, at higher concentrations, it lowers the potential maximum DR due to embrittlement of the extrudate. Carbon black has the advantages of providing ultraviolet protection, and dissipating static electricity, by making the polymer electrically conductive. The electrical conductivity may also be useful for electrical heating of the billet to control its EA performance.

The present invention may be applied to load limiting devices in general aviation seats, as part of landing gear in helicopters and other craft, bumper systems for ground transportation vehicles, safety fences on highways, at the bottom of an elevator pier to counteract the effects of free falling crashes, for payload parachuting, and for any other systems where it is desirable to control the effects of deceleration. Thus, the transmission means referred to above may be at least part of a structural component of any of these items.

Generally, the at least one discrete ductile solid shape may comprise at least one member selected from polymers and non-polymeric waxes, e.g. hydrocarbon waxes. Suitable polymers are, for example, polyolefins (e.g. polypropylene or ultra high molecular weight polyethylene), polyamides, polyacetal, poly(haloalkenes), polyetherether ketones and polycarbonates. Other ingredients which may be present are e.g. carbon black, metals, metal salts, other metal compounds, silica, antioxidants, stabilizers, plasticizers, lubricants, crosslinking agents, powder fillers, fibers, flakes, microbeads and microballoons.

The at least one discrete ductile solid shape is typically placed in a sleeve which supports the solid shape against buckling. A piston is used to force the ductile solid towards the die and the sleeve is operative to guide the piston's motion. The sleeve is typically elongate and is strong enough to maintain mechanical integrity under impact (i.e. the elongate sleeve does not buckle or crack). To this end, it is typically manufactured from strong but lightweight materials.

Alternatively, the sleeve can be a crushable sleeve which moves with the ductile solid as it is being pushed towards a crushing location on a die. The portion of the crushable sleeve which is above the die supports the portion of the ductile solid which is above the die; however, as the ductile solid-crushable sleeve combination reaches the die, the ductile solid is extruded through the hole of the die and the crushable sleeve fragments and opens flower-like around the base of the die. Thus, the crushable sleeve supports the ductile solid and additionally absorbs some impact energy.

Further, the die can be placed in an enclosing structure, such as a cage, which comprises slots through which the crushable sleeve fragments can flow. The invention will now be illustrated by the following non-limitative Examples.

A billet 80 mm. in length, diameter 10.26 mm., and having a 20° conical tip, was machined from commercially available polypropylene rod (d=0.92 g./cm.$^3$, melting range=165° to 170° C.). The billet (2, FIG. 1) was placed in a steel elongate sleeve (4) of inner diameter 11 mm. A conical die (6) having a 20° cone angle, 11 mm. inlet diameter and a 4.45 mm. diameter, 10 mm. long outlet, was pressure fitted to the end of the elongate sleeve. A matching steel piston (8) was inserted into the other end of the elongate sleeve, so that the billet was between the piston and the die. All parts were lubricated with a hydraulic oil. The assembly was placed in a hydraulic press (not illustrated except for the special bore (10) in the base (14) of the press, which allows free extrusion. When activated, the hydraulic ram pushed the piston in the direction of arrow (12) into the elongate sleeve, at a rate of 0.025 meter/sec., extruding the polypropylene billet through the die. The extrusion force, recorded at a steady state, was 30.8±2.4 kN. Prior to the experiment, the temperature of the room and the billet was 13° C. The SEA of this billet was determined to be 352 J/g. The extrudate has a fibrillated, rough surface, some 45° off axis scars, but it was nevertheless continuous and strong.

As with Example I, the apparatus illustrated in FIG. 1 was used. A billet 80 mm. in length, diameter 8.2 mm., and having a 20° conical tip, was machined from commercially available polyethylene molded rod (American-Hoechst Hostalen GUR-412, estimated average MW 3.3×10$^6$). The billet was placed in a steel elongate sleeve of inner diameter 9 mm. A conical die having a 20° cone angle, 9 mm. inlet diameter and a 4.45 mm. diameter, 10 mm. long outlet, was pressure fitted to the end of the elongate sleeve. A matching steel piston was inserted into the other end of the elongate sleeve, so that the billet was between the piston and the die. All parts were lubricated with a hydraulic oil. The assembly was placed in a hydraulic press having a special bore to allow free extrusion. When activated, the hydraulic ram pushed the piston into the elongate sleeve, at a rate of 0.025 meter/sec., extruding the polyethylene billet through the die. The extrusion pressure, recorded at a steady state, was 1585±0 bars. Prior to the experiment, the temperature of the room and the billet was 10° C. The SEA of this billet was determined to be 166 J/g. Extrusion proceeded evenly; the extrudate surface was smooth, without any cracks or pinholes. The DR was about 4.1.

As with Example I, the apparatus illustrated in FIG. 1 was used. A billet 80 mm. in length, diameter 8.2 mm., and having a 20° conical tip, was machined from commercially available polyethylene molded rod (American-Hoechst Hostalen GUR-415, estimated average MW $5 \times 10^6$). The billet was placed in a elongate steel sleeve of inner diameter 9 mm. A conical die having a 20° cone angle, 9 mm. inlet diameter and a 4.45 mm. diameter, 10 mm. long outlet, was pressure fitted to the end of the elongate sleeve. A matching steel piston was inserted into the other end of the elongate sleeve, so that the billet was between the piston and the die. All parts were lubricated with a hydraulic oil. The assembly was placed in a hydraulic press having a special bore to allow free extrusion. When activated, the hydraulic ram pushed the piston into the elongate sleeve, at a rate of 0.025 meter/sec., extruding the polyethylene billet through the die. The extrusion pressure, recorded at a steady state, was 1640±200 bars. Prior to the experiment, the temperature of the room and the billet was 10° C. The SEA of this billet was determined to be 173 J/g. Although the extrudate didn't break, deep ductile cracks turning to a continuous helical crack, covered its surface. Extrusion pressure varied about 25%. The DR was 4.1.

It will be appreciated that friction forces between the billet and the elongate sleeve vary as the billet moves toward and through the die.

A billet (22, FIG. 2) 150 mm. in length, diameter 10 mm., and having a 20° conical tip, was machined from commercially available polyethylene molded rod (American-Hoechst Hostalen GUR-412, estimated average MW $3.3 \times 10^6$), and placed in a steel elongate sleeve (24) of inner diameter 11 mm. A conical die (26) having a 20° cone angle, 11 mm. inlet diameter and a 6.5 mm. diameter, 10 mm. long outlet, was pressure fitted to the end of the elongate sleeve. A matching steel piston (28) was inserted into the other end of the elongate sleeve, so that the billet was between the piston and the die. All parts were lubricated with a hydraulic oil. The assembly was placed vertically (piston pointing upward), via stand (32), with central space (42) to allow a free exit for the extrudate, on a 4 cm. thick steel base plate (30), which was levelled on concrete foundation (34). A 34 cm. long, 12.2 cm. diameter steel rod (36), weighing 31 kg. was lifted to a height of 1.75 meters by means of a nylon rope attached at ring (44) and a light pulley (not shown); friction force in free falling was 1 kg. The weight hung within a vertical plastic pipe (38) (14.2 cm. inside diameter), the weight having 8 longitudinal plastic fins (40) to center it in the pipe, with an average clearance between the finned weight and the pipe's inner surface of 2 mm. While falling, the weight did not make contact with the inner surface of the pipe.

The rope was released and the weight fell, impacting the piston, pushing it 8.2 cm. into the elongate sleeve, until it came to rest at the top of the piston, supported by the inner wall of the pipe. The weight came to rest quietly and the extrudate surface was smooth and uncracked. The kinetic energy of the impacting weight was 515 J. Since the piston's stroke was 8.2 cm., the average force was 515/0.082=6280N or 640 kgf. The SEA was 85 J/g., for a DR of 2.86.

Figure 2:
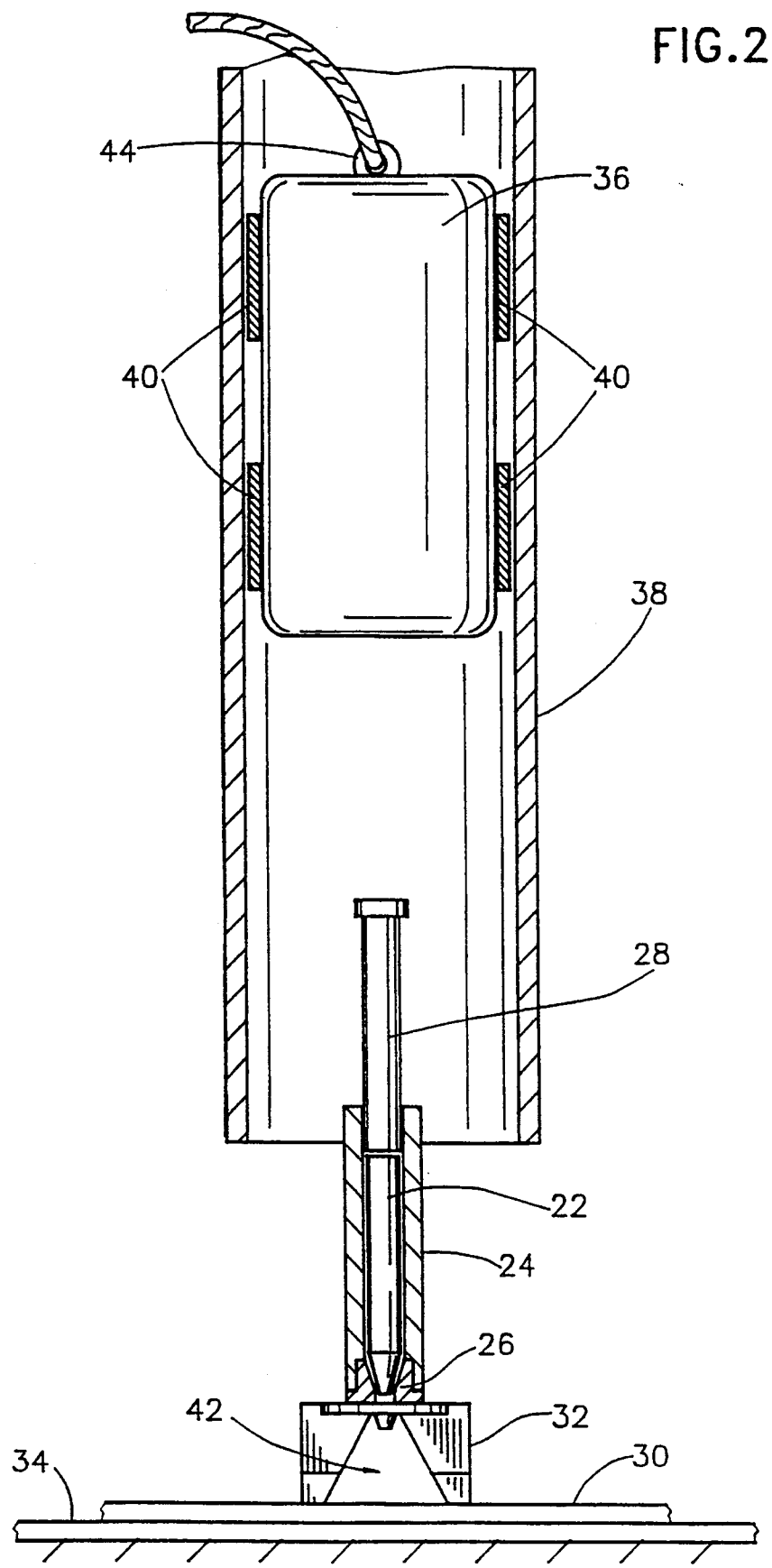
FIG. 2 illustrates in section, a falling weight experiment on the embodiment of FIG. 1.

As with Example IV, the apparatus illustrated in FIG. 2 was used. A billet 130 mm. in length, diameter 10 mm., and having a 20° conical tip, was machined from commercially available nylon-6 rod (Akzo Chemie "Akulon"), and placed in a steel elongate sleeve of inner diameter 11 mm. A conical die having a 20° cone angle, 11 mm. inlet diameter and a 4.9 mm. diameter, 10 mm. long outlet, was pressure fitted to the end of the elongate sleeve. A matching steel piston was inserted into the other end of the elongate sleeve, so that the billet was between the piston and the die. All parts were lubricated with a hydraulic oil. The assembly was placed vertically (piston pointing upward) on a base that had a center bore to allow a free exit for the extrudate. The die assembly was placed on a 4 cm. thick steel plate that was levelled on a concrete foundation. A 34 cm. long, 12.2 cm. diameter steel rod, weighing 31 kg. was lifted to a height of 7 meters by means of a nylon rope and a light pulley (friction force in free falling: 1 kg.). The weight hung within a vertical plastic pipe (14.2 cm. inside diameter), the weight having 8 longitudinal plastic fins to center it in the pipe, with an average clearance between the finned weight and the pipe's inner surface of 2 mm. While falling, the weight did not make contact with the inner surface of the pipe. The rope was released, and the weight fell, impacting the piston, pushing it into the elongate sleeve, until it came to rest at the top of the piston, supported by the inner wall of the pipe. The weight came to rest quietly after pushing the piston 6.8 cm., and the extrudate surface was smooth and uncracked. The velocity at first contact was estimated at 11.7 meters/sec. The kinetic energy of the impacting weight was about 2060 J. Since the full stroke wasn't utilized, the weight was lifted again to a 3 meter height and dropped on the EA device. At this time the stroke was 2.55 cm. long, when the weight stopped. Since the first impact deformed the billet to attain the elongate sleeve's inner diameter (1.1 cm.), the SEA of the billet during the second stroke could be calculated, neglecting air resistance and EA by the steel/concrete base. Estimated value of SEA was 319 J/g, while the DR was 5. The decelerating average force was about 36 kN. The surface of the extrudate was smooth, with no cracks or pinholes.

As with Example V, the apparatus illustrated in FIG. 1 was used. However, the thickness of elongate sleeve 4 was reduced to 0.8 mm. A billet 150 mm. in length diameter 10 mm., and having a 20° conical tip, was machined from commercially available nylon-6 rod (Akzo Chemie "Akulon"), and placed in the thinned steel elongate sleeve of inner diameter of 11 mm. A conical die having a 20° cone angle, 11 mm. inlet diameter and a 6 mm. diameter, 10 mm. long outlet, was pressure fitted to the end of the elongate sleeve. A matching steel piston was inserted in the other end of the sleeve, so that the billet was located between the piston and the die. The experiment was conducted as with Example V. However, the weight was dropped from a height of 5 mm. The weight came to rest after pushing the piston 84 mm. The extrudate surface was smooth and uncracked. The velocity at first contact was estimated at 9 m./sec. The steel elongate sleeve did not break or deform, though the decelerating force was 17.5 kN, or 1.79 metric tons. Estimated value of SEA for the billet material was 195 J/g, while the extrusion draw ratio was 3.36.

The ultimate tensile strength of the elongate sleeve's steel is about 60,000 psi, or 4218 kgf (cm*cm). If the extrusion pressure (equal in all directions), then the wall thickness required to sustain the related hoop stress is 3.08 mm. The actual wall thickness was 0.8 mm., or 26% of the minimal design thickness.

It will be appreciated that the elongate sleeve functions, in this example, to support the billet and to guide the piston as the two elements moved toward the die. For this example, the elongate sleeve was manufactured of steel, although it could alternatively have been manufactured from materials such as other metals, ceramics, carbon or polymers. The elongate sleeve should be strong but lightweight and able to maintain mechanical integrity in the fact of an impact.

A billet 52 (FIG. 3) 100 mm. in length, diameter 19.6 mm. and having a 20° conical tip, was machined from commercially available nylon-6 rod (Akzo Chemie "Akulon"), and placed vertically in a steel die 53 (FIG. 3), so that an 80 mm. long section of the billet protruded above the entrance of the die. The conical die having a 20 degrees cone angle, 20 mm. inlet diameter and a 16 mm. diameter, 8 mm. long outlet, was placed vertically on a base that had a center bore to allow a free exit for the extrudate. The die assembly was placed on a 40 mm. thick steel plate, as illustrated in FIG. 2 with two changes: neither a sleeve nor a piston were present. The procedure of Example V was applied, the weight was dropped from a 4 m. height, impacting the upper part of the billet, pushing it into the die 53 mm. until it came to rest. The billet did not buckle. Extrudate maintained its continuity, with not cracks or pinholes. Extrusion force was 22 kN or 2.2 metric tons. The SEA was 64 J/g., for a die draw ratio of 1.56.

A billet 70 (FIG. 4) 170 mm. in length, diameter 19 mm. and having a 20 degrees conical tip, was machined from commercially available nylon-6 rod (Alzo Chemie "Akulon"). The billet was coated with an oil film, and inserted into a fiberglass reinforced polyester crushable sleeve 72, having an inner diameter of 20 mm. and 150 mm. in length.

The composite crushable sleeve was produced by the pultrusion process. The crushable sleeve's front end, and the billet in it were inserted into a die 74 having at its center a conical bore 76 which accommodates the tip 78 of the billet 70. The inlet diameter of the die was 20 mm., the outlet's diameter was 14 mm. and the cone angle was 20 degrees.

The inner surface of the composite crushable sleeve was located at a sleeve-crushing zone 80 of the die. A metallic bushing 82 supported the composite crushable sleeve's outer surface. The upper ends of the billet and the composite crushable sleeve, were at the same height. The die assembly was arranged to allow unimpeded exit of the extrudate.

Figure 4:
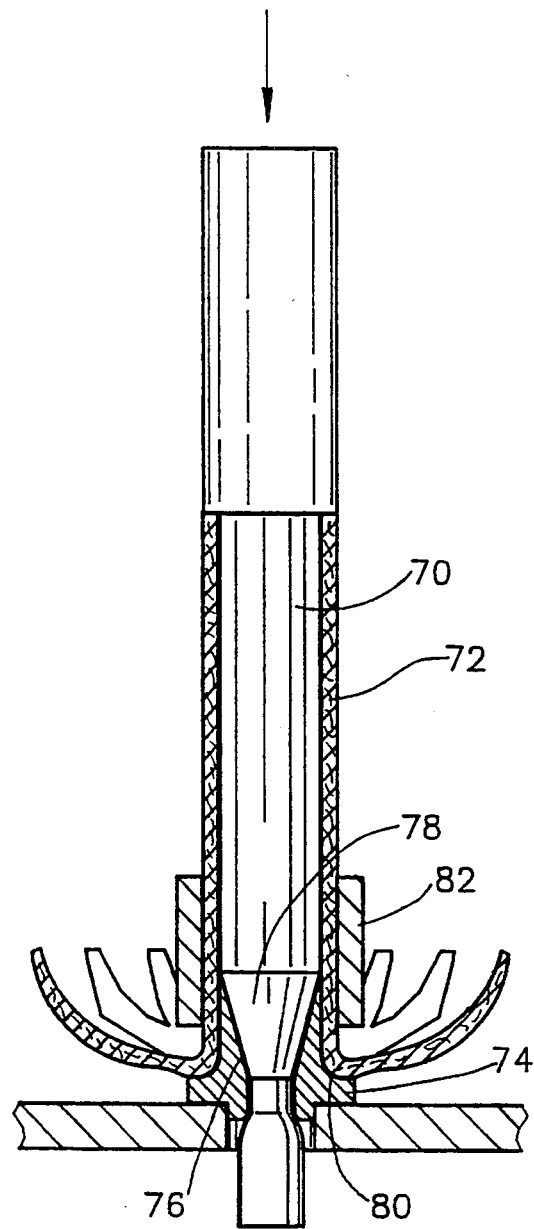
FIG. 4 illustrates a preferred embodiment of the present invention, in partially cut away sectional illustration.

A free falling weight was dropped on the billet's/composite's upper ends, from a height of 7 m., according to the procedure that is described in Example IV. The weight came to rest after stroking 35 mm. The extrudate was uncracked and had a smooth surface. 35 mm. of the composite crushable sleeve was crushed and opened flowerlike around the base of die 74. Above the metallic bushing, the composite crushable sleeve did not break. The decelerating force was about 59 kN, or 6 metric tons. The device's SEA (when weights of both billet and crushable sleeve were considered), was 83 J/g. The apparatus of FIG. 4 is a pistonless device where most of the stopping force is transmitted through the billet. The composite crushable sleeve supports the billet against buckling and absorbs also some energy while being crushed.

In accordance with a preferred embodiment of the invention, the composite crushable sleeve is fixed to the billet and moves together therewith. According to one embodiment of the invention, the billet does not completely fill the sleeve. According to an alternative embodiment of the invention, the sleeve may be provided without the billet. In all embodiments, the crushable sleeve is preferably formed of fiber reinforced plastic.

It will be appreciated that the crushable sleeve performs as an elongated sleeve above the metallic bushing 82 with the exception that the crushable sleeve moves with the billet 70 toward the crushing zone 80 of the die 74. Additionally, in this example, there is no piston which pushes the billet towards the die.

It will further be appreciated that the crushable sleeve must be made of a material that will break in an organized and predictable manner such that its fragments do not jam in the die 74. Suitable materials for the crushable sleeve include ceramics, metals, carbon and polymers with the abovementioned restriction that they break in a controllable manner.

Both the crushable sleeve the elongate sleeve may preferably be comprised of a reinforcing-material/matrix composite. The reinforcing material can be in any shape and form, such as continuous rovings, chopped strands, mats, fabrics, tapes, and whiskers and flakes, and is typically manufactured from glass, carbon, ceramics, boron, kevlar, ultra high molecular weight polyethylene, or other polymeric or metallic fibers. The matrix material is typically a thermosetting or theroplastic polymer such as epoxy, polyester, polyvinylester, polyphenylenesulfide, polyimide, or polyamideimide.

The composite sleeve is typically manufactured via filament and prepreg winding, pultrusion, casting or molding, or any other method which will produce a composite sleeve.

It will further be appreciated that the device of the present invention maintains its mechanical integrity during an elastic rebound which typically occurs after a crash. In the embodiment of FIG. 4, during impact, the ductile solid is extruded through the hole in the die, after which it swells, and the crushable sleeve is broken into elongate stringlike elements. During an elastic rebound, the ductile solid and the crushable sleeve would ideally move in an upward directions. However, moving them in the upward direction requires work to be expended since the swollen extruded ductile solid and the flowerlike crushed composite sleeve are not easily returned to their previous shapes. Thus, it will be appreciated that the abovementioned embodiment of the present invention absorbs energy during the elastic rebound and reduces its affect.

A billet 100 (FIGS. 5A–5C) 210 mm. in length, 23 mm. in diameter and having a tip 101, was machined from commercially available nylon-6 rod (Akzo Chemie "Akulon"). The billet 100 was inserted into a pultruded polyester/fiberglass crushable sleeve 102 having an inner diameter of 24 mm., an outer diameter of 29.5 mm. and a length of 200 mm. The billet 100 and sleeve 102 form an elongated body 103 which is typically covered at a first end by an impact surface 99, typically of metal. It will be appreciated that the crushable sleeve 102 did not touch the billet 100 at the location of the tip 101.

A second end of the elongate body 103 was inserted into deforming and crushing apparatus 104 located inside a threaded sleeve 106.

Apparatus 104 typically comprises a die 110 having a conical bore 112 for deforming billet 100 upon its receipt of an axial force along a longitudinal axis 108. Die 110 additionally comprises a conical outer surface 116 located between two cylindrical portions 118 and 120 of differing diameter, wherein portion 118 has a smaller diameter than 120.

Apparatus 104 additionally typically comprises a cage 114 for enclosing die 110. Cage 114 typically comprises a base 122, upon which sits die 110, which includes a hole 124 through which a deformed billet can pass. Base 122 is shown in FIG. 6B. Integrally attached to the base 122 is a cylindrical frame comprising an upper portion 126, typically threaded on its outside surface thereby to engage with the threaded sleeve 106, and a lower portion 128 comprising a multiplicity of slots 130, typically 3–16, shown in FIG. 6A. The inner diameter of the cylindrical frame is typically slightly larger than the outer diameter of portion 120 of the die 110.

Sleeve 106 typically comprises a cylinder 130 which is threaded on an inner surface 131 thereby to engage with the threaded upper portion 126, and a flange 132 typically for attaching the device of the present invention to a fixed surface.

Elongate body 103 was inserted into apparatus 104 as follows: billet 100 was inserted into die 110 so that its tip 101 fit into and through conical bore 112 and crushable sleeve 102 was inserted between the die 110 and the upper portion 126 and rested on conical outer surface 116. A gap 117 is typically formed between the outer surface of the crushable sleeve 102 and the inner surface of upper portion 126. The first end of the elongate body 103 projected an extension length $d_1$ of 100 mm. above the flange 132 and the entire assembly of body 103, apparatus 104 and sleeve 106 was supported at the flange 132 by a heavy walled steel sleeve (not shown).

Figure 5B:
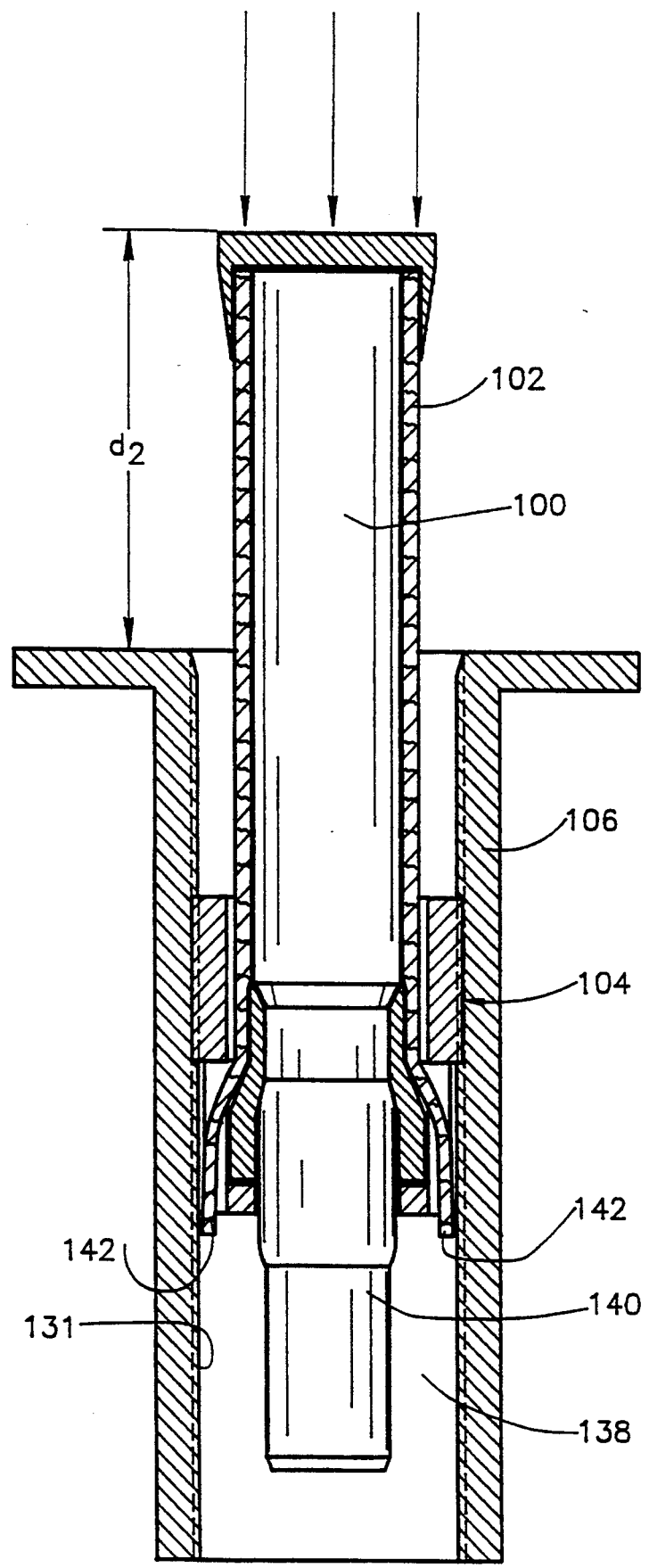

A free falling 30 kg. steel weight having a cylindrical shape was dropped onto the impact surface 99 from a height of 7.5 m, according to the procedure described in Example IV. The weight came to rest through forcing the elongate body 103 into the apparatus 104, as shown in FIG. 5B.

A portion 140 of billet 100 was extruded through the die 110 and out through hole 124. A portion of crushable sleeve 102 was crushed against the conical surface 116 and was forced out of the cage 114 and into an inner space 138 of the sleeve 106 through the multiplicity of slots 130, thereby breaking the portion of the crushable sleeve 102 into a multiplicity of crushed strips 142. Energy was expended through the extrusion of the billet 100, through the crushing of the sleeve 102 and through the frictional movement of the crushed strips 142 through the slots 130 and against the inner surface 131 of sleeve 106. It will be appreciated that, in order for the crushable sleeve 102 to break into the strips 142, the cross-sectional area between the conical surface 116 and an inner surface of the lower portion 128 of cage 114 at the point of crushing of the crushable sleeve 102 should be greater than or equal to the cross-sectional area of the crushable sleeve 102 before crushing.

The stroke of the free falling weight was 28 mm., reducing the extension length to a length of 72 mm. above the flange 132, marked $d_2$, and the stopping force was calculated at 78 kN. The portion of the elongate body 103 above the die 110 did not crush or crack.

Figure 5C:
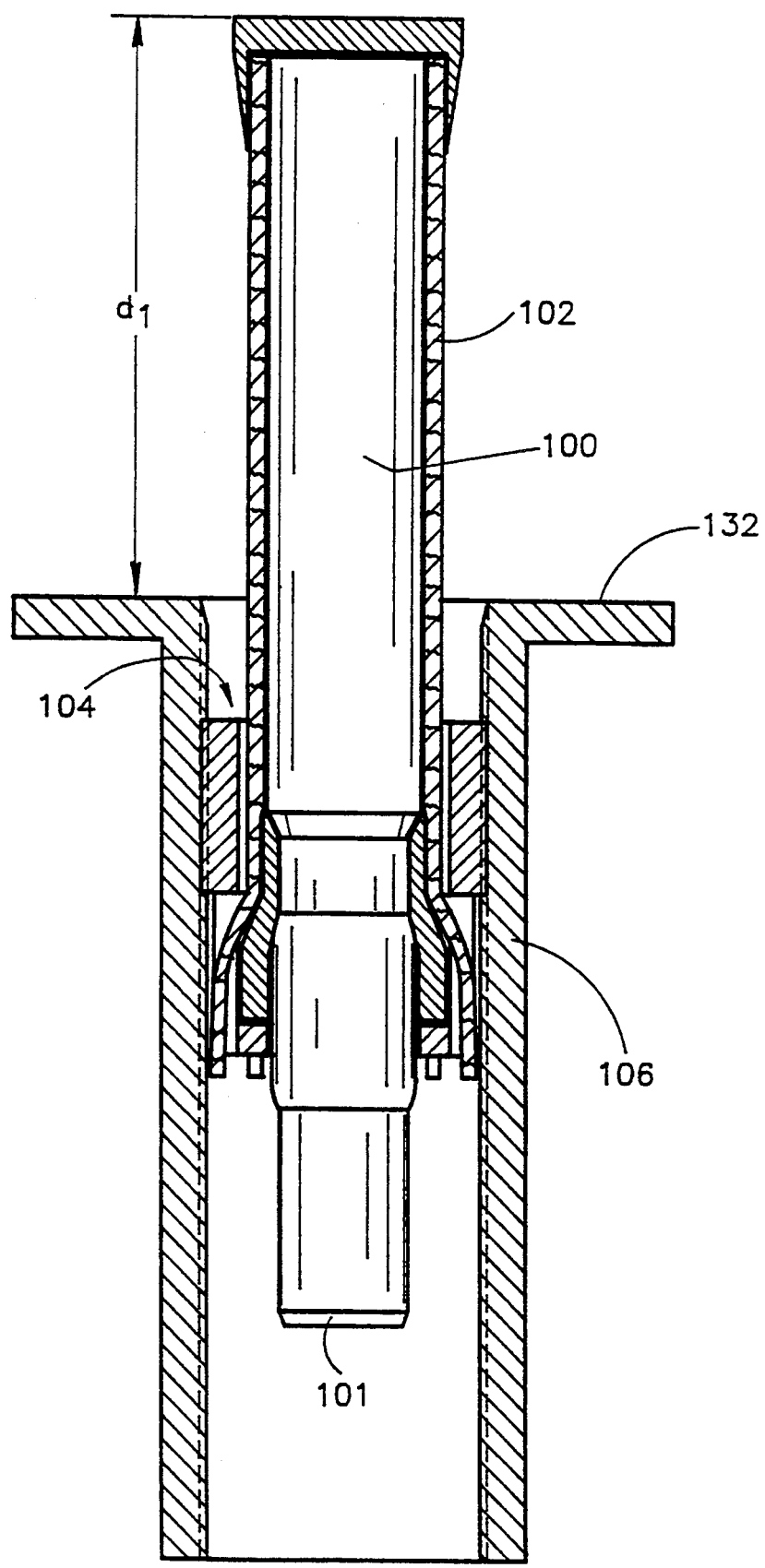

As shown in FIG. 5C, the extension length $d_1$ is recovered to enable the device of the present invention to be reused. To recover the extension length $d_1$, apparatus 104, with the body 103 inside of it, is turned with respect to threaded sleeve 106 towards flange 132.

Accordingly, further impacts can be performed. A second and third impact performed with the abovedescribed elongate body 103 yielded similar results to the first impact.

The device described herein can be used for an automotive bumper system 150 attached to a car chassis 154 as shown in FIGS. 7A–7C. The bumper system 150 comprises a bumper 152 attached to prior art energy absorbing devices, such as an elastic element 156 and a hydraulic shock absorber 158, which, in turn, are attached to the device of the present invention, marked 158, typically through impact surface 99. Sleeve 106 is typically attached to chassis 154 via flange 132. Alternatively, the device 158 of the present invention can be attached to the prior art devices via sleeve 106 and the impact surface 99 can be attached to the chassis 154. The state of the device 158 of the present invention as shown in FIG. 7A is shown in detail in FIG. 5A.

In the presence of an impact force on the bumper 152, such as might occur during a traffic accident, the bumper 152 transmits force to the impact surface 99, causing the elongate body 103 to be forced into the apparatus 104 thereby causing energy to be dissipated. The bumper system 150 is then in the state illustrated in FIG. 7B wherein the extension length is $d_2$. This is shown in detail in FIG. 5B.

The bumper system 150 is restored to a useful state, as shown in FIG. 7C and in detail in FIG. 5C, by turning the apparatus 104 with respect to sleeve 106 towards flange 132.

According to an alternative embodiment of the present invention, illustrated in FIGS. 8A and 8B, the deforming and crushing apparatus, marked 159, is comprised of a die, marked 160, and a cage, marked 166, whose locations with respect to each other are changeable. Die 160 is formed with threads 162 on the outside of a bottom portion 164. The cage 166 is formed with matching threads 168 formed on the surface of hole 124. In this manner, the height of die 160 within cage 166 can be changed so as to change the location of the conical surface 116 with respect to the incoming crushable sleeve 102 thereby to change the angle, marked $\alpha 1$ on FIG. 8A and $\alpha 2$ on FIG. 8B, at which the crushed strips 142 of the crushable sleeve 102 leave through the slots 130. FIG. 8B shows the die 160 in a position to produce $\alpha 2$ which is a smaller angle than $\alpha 1$ of FIG. 8A. The smaller the angle of leaving, the more energy is dissipated by the crushable sleeve 102.

The embodiment of FIGS. 8A and 8B can be utilized with a body 103 comprising a billet 100 and crushable sleeve 102, or, alternatively, the body 103 can be comprised only of the crushable sleeve 102.

An energy absorption device utilizing apparatus 159 can be implemented in safety systems, such as seats, for loads of varying weight. For example, in a crash landing of an aircraft, the deceleration of a heavy seated person and a light seated person will differ significantly when an identical load limiting device is applied to them. However, they ideally should be decelerated at an identical, safe rate, until their crash velocity is reduced to close to zero. This requires that the energy absorbing device for a heavy person apply more force for the same stroke, thereby absorbing more energy, than is needed for a light person. If the person's weight is known a priori, an energy absorption device utilizing the apparatus 159 of FIGS. 8A and 8B can accordingly change the location of die 160 with respect to cage 166.

A seat designed to absorb energy in a crash is shown in FIG. 11. The seat, marked 201, is typically a collapsible energy absorbing seat with legs 203 hinged to both the floor 204 and a base 202 of the seat 201. The base 202, floor 204 and legs 203 comprise a parallelogram 205 along whose short diagonal is placed the device of the present invention, marked 206. The device 206 can be the device of any of the embodiments shown hereinabove and particularly in the embodiment of FIGS. 8A and 8B.

In a crash situation, the seat 201 will collapse forward toward the floor 204 and will place a compressive axial impact force on the device 206.

A further alternative embodiment of the present invention, utilizing a tensile force rather than a compressive impact force, is shown in FIG. 9. In this embodiment, the elongate body, marked 170, comprising a billet 171 and a crushable sleeve 173, is formed with a hollow bore 172 within which is a strong wire 174, such as of steel.

The strong wire 174 is attached at a first end to a plug 176 via an anchoring device 178, such as a lock nut, and at a second end to a source of tensile force. The compression plug 176 is firmly attached to a first end of the elongate body 170.

The elongate body 170 is deformed and crushed via deforming and crushing apparatus 180, located at a second end of the elongate body 170. Apparatus 180 comprises a sleeve supporting ring or cage 182 for supporting the crushable sleeve 173, a crushing and extruding die 184 for crushing the crushable sleeve 173 and for extruding the billet 171. The cage 182 has a multiplicity of slots 183 through which flow portions 185 of crushed sleeve. Apparatus 180 additionally comprises means 186 for attaching the die 184 to the cage 182, such as matching threads on die 184 and on cage 182 (as shown in FIG. 9) for adjustably adjusting the location of the die 184 relative to the cage 182, or glue for permanently setting the locations of the die 184 and the cage 182.

The elongate body 170 is deformed and crushed, in a manner similar to that described hereinabove in conjunction with previous embodiments, in the presence of a tensile force on strong wire 174. The wire 174 is pulled towards apparatus, causing the compression plug to push the elongate body 170 into apparatus 180. It will be appreciated that apparatus 180 is supported by a support (not shown which has a hole in it to allow for the flow of the deformed billet 171.

Reference is now made to FIG. 10 which illustrates a further alternative embodiment illustrating the use of a tensile force rather than a compressive impact force. In this embodiment, the extrusion of the billet 171 and the crushing of the crushable sleeve 173 do not occur at the same location and therefore, there is relative motion between the billet 181 and the crushable sleeve 173.

The extrusion occurs at a conical extrusion die 190, located at a first end of the elongate body 170 and supported by a support (not shown) with a hole in it to allow for the flow of the deformed billet 171. Extrusion die 190 additionally comprises a sleeve support portion 191 for supporting the crushable sleeve in the area of the extrusion.

The crushing occurs at a crusher 192 located at a second end of the elongate body 170. The crusher 192 comprises a crusher cup 200 and a support cage 194 with a multiplicity of slots 196 through which flow crushed sleeve portions 198. The height of the crusher cup 200 with respect to the locations of the slots 196 is adjustable via means 202 for attaching the crusher cup 200 to the cage 192. Means 202 might be comprised of matching threads on crusher cup 200 and on cage 194 (as shown in FIG. 10) for adjustably adjusting the location of the crusher cup 200 relative to the cage 194, or it might be comprised of glue for permanently setting the locations of the crusher cup 200 and the cage 194.

The adjustment of cage 194 with respect to crusher cup 200 reduces the free length of the slots 196 thereby decreasing the crushing angle of the crushable sleeve 173. As has been described hereinabove, the smaller the crushing angle for the crushable sleeve 173, the more force is required to push crushed sleeve portions 198 out of slots 196.

While the present invention has been particularly described, it will be appreciated by persons skilled in the art that many modifications and variations may be made without departing from the concept of the invention. By way of illustration only, the cone-shaped end of the billet of ductile material may be pointed, or the point may be sheared off laterally to form a cone frustum; or the overall billet may have the shape of two coaxial longitudinally opposed cone-frustum-ended billets (of the same or different diameters, and having the same or different cone angles), in which the frustums may be joined by a coaxial "waist"; or instead of a billet there by be used a sheet which is extruded through rollers or through a slot. Thus it will be evident that such (and other) modifications and variations may be made without departing from the spirit or scope of the invention as set forth in the appended claims.

I claim:

1. An energy absorption device comprising:
an elongate body arranged along a longitudinal axis to receive an axial impact force at a first end thereof along the longitudinal axis, and
means arranged adjacent a second end of said body for deformation thereof, said means including die means for producing deformation of said body and ring means attached to said die means and spaced therefrom for surrounding said body.

2. An energy absorption device according to claim 1 and wherein said means arranged adjacent a second end of said body include means for locally deforming said body in the vicinity of said die.

3. A device for absorbing energy during an axial initial impact and during an elastic rebound in a direction opposite that of said axial initial impact, comprising:
an elongate body arranged along a longitudinal axis and comprising elongate fibers along its axis, the elongate body being operative to receive said axial initial impact force at a first end thereof along said longitudinal axis;

means arranged adjacent a second end of said body for deformation thereof said means including die means for producing deformation of said body and ring means attached to said die means and spaced therefrom for surrounding said body adjacent said die means, said die means and said ring means cooperative to locally break said elongate fibers into elongate stringlike elements which maintain high tensile strength during said elastic rebound.

4. An energy absorption device according to claim 3 and including means for adjusting the location of said die means with respect to said ring means.

5. An energy absorption device comprising:
a crushable sleeve arranged along a longitudinal axis operative to receive an axial impact force at a first end thereof along said longitudinal axis;
deforming and crushing means arranged adjacent a second end of said crushable sleeve, said deforming and crushing means including:
die means for producing deformation of said crushable sleeve, wherein said die means have an outer conical surface; and
cage means for enclosing said die means and for producing crushing of said crushable sleeve, wherein said cage means have a plurality of slots and an inner surface and wherein said crushing occurs between said conical surface and said inner surface in the area of each of said plurality of slots.

6. An energy absorption device according to claim 5 and also comprising a threaded sleeve and wherein said cage means include threaded means for moving said deforming and crushing means inside of said threaded sleeve.

7. An energy absorption device according to claim 5 and also including means for adjusting the location of said die means with respect to said cage means thereby to control the amount of energy absorbed.

8. An energy absorbing device according to claim 5 and also comprising:
a collapsible seat frame having at least two legs hingeably attached between said seat frame and a floor, wherein said at least two legs form two sides of a parallelogram and said seat frame and said floor form the other two sides of said parallelogram and wherein said crushable sleeve is attached along a diagonal of said parallelogram.

9. A repeatable energy absorption device comprising:
a deformable and crushable body arranged along a longitudinal axis operative to receive an axial impact force at a first end thereof along said longitudinal axis,
deforming and crushing means arranged adjacent a second end of said body for deformation thereof and for crushing thereof wherein said deforming and crushing means include threaded means on an outside surface thereof and wherein upon receipt of said axial impact, said first end of said body moves from a first position away from said deforming and crushing means to a second position closer to said deforming and crushing means; and
threaded sleeve means having a first end for supporting said deforming and crushing means and for moving said deforming and crushing means toward said first end after said axial impact thereby to return said first end of said body to said first position.

10. A vehicle with an energy absorption device comprising:
a chassis;
a bumper for receiving impact forces; and
an energy absorption device disposed between said chassis and said bumper for absorbing impact energy comprising;
a deformable and crushable body arranged along a longitudinal axis operative to receive said impact forces at a first end thereof along said longitudinal axis;
deforming and crushing means arranged adjacent a second end of said body for deformation and crushing thereof wherein said deforming and crushing means include threaded means on an outside surface thereof and wherein upon receipt of said impact forces, said first end of said body moves with said bumper from a first position away from said deforming and crushing means to a second position closer to said deforming and crushing means; and
threaded sleeve means having a first end attached to said chassis for supporting said deforming and crushing means and for moving said deforming and crushing means toward said first end after said impact forces thereby to return said first end of said body to said first position.

11. An energy absorption device comprising:
a crushable sleeve operative to receive an axial impact force at a first end thereof;
crushing means arranged adjacent to a second end of said sleeve for crushing of said crushable sleeve, said crushing means including:
die means having an outer conical surface; and
cage means for enclosing said die means and for producing crushing of said crushable sleeve, wherein said cage means has a plurality of slots and an inner surface and wherein said crushing occurs between said conical surface and said inner surface in the area of each of said plurality of slots.

12. An energy absorption device according to claim 11 and also including means for adjusting the location of said die means with respect to said cage means thereby to control the amount of energy absorbed.

13. An energy absorption device according to claim 11, wherein said cage means comprises a tubular body, said energy absorbing device further comprising an outer sleeve for mounting of said energy absorption device, said tubular body being threadably connected to said outer sleeve.

14. An energy absorption device according to claim 13, wherein said slots are arranged in circumferentially spaced relation in said tubular body, said tubular body having a lower end including a base on which said die means is supported.

15. An energy absorption device according to claim 14, further comprising an elongate body of a ductile material arranged along a longitudinal axis and operative to receive an axial impact force at a first end thereof along said longitudinal axis.

* * * * *